United States Patent [19]
Guitoneau

[11] Patent Number: 5,632,512
[45] Date of Patent: May 27, 1997

[54] FASTENING COUPLING FOR A RINGED TUBE

[75] Inventor: Hans Guitoneau, Grootebroek, Netherlands

[73] Assignee: Polva Pipelife B.V., Enkhuizen, Netherlands

[21] Appl. No.: 533,288

[22] Filed: Sep. 25, 1995

[30] Foreign Application Priority Data

Sep. 23, 1994 [BE] Belgium ................... 09400866

[51] Int. Cl.$^6$ ............................................. F16L 37/088
[52] U.S. Cl. ........................... 285/321; 285/903; 285/308
[58] Field of Search ................................. 285/321, 308, 285/81, 903, 375, 377

[56] References Cited

U.S. PATENT DOCUMENTS

| | | | |
|---|---|---|---|
| 2,260,712 | 10/1941 | Harrison | 285/321 |
| 3,352,576 | 11/1967 | Thorne-Thomsen | 285/321 |
| 3,428,340 | 2/1969 | Pelton | 285/321 |
| 3,439,943 | 4/1969 | Thorne-Thomsen | 285/321 |
| 4,513,998 | 4/1985 | Grossauer | 285/903 |
| 4,541,657 | 9/1985 | Smyth | 285/308 |
| 4,591,192 | 5/1986 | Van Exel et al. | 285/308 |
| 4,919,462 | 4/1990 | Matsui et al. | 285/903 |
| 4,989,905 | 2/1991 | Rajecki | 285/903 |

FOREIGN PATENT DOCUMENTS

| | | |
|---|---|---|
| 0381979 | 8/1990 | European Pat. Off. . |
| 0444857 | 9/1991 | European Pat. Off. . |
| 0564132 | 10/1993 | European Pat. Off. . |
| 1512686 | 2/1968 | France . |
| 9312151 | 6/1994 | Germany . |

*Primary Examiner*—Eric K. Nicholson
*Attorney, Agent, or Firm*—Young & Thompson

[57] ABSTRACT

Fastening coupling for a ringed tube, comprising at least one sleeve (18), the inside diameter of which is at least equal to the largest outside diameter of the ringed tube, inside which one end of the ringed tube becomes housed, as well as a fastening ring (10), in which the sleeve (18) includes at least two circumferentially aligned orifices (28), each comprising a wide part (30) and a narrow part (32), these parts being adjacent and intercommunicating; the ring (10) is circumferentially discontinuous and radially deformable and is provided with at least two tenons (12) projecting inwards, each one comprising a narrow base (13); the ring (10) can be applied around the sleeve (18) so that each tenon (12) passes through the wide part (30) of an orifice (28) and engages in the ringed structure of the tube (48) so as to retain it axially inside the sleeve (18); it being possible, by rotating the ring (10), to fit the narrow base (13) of each tenon into the narrow part (30) of an orifice (28) so as to prevent any radial movement of the ring (10).

9 Claims, 5 Drawing Sheets

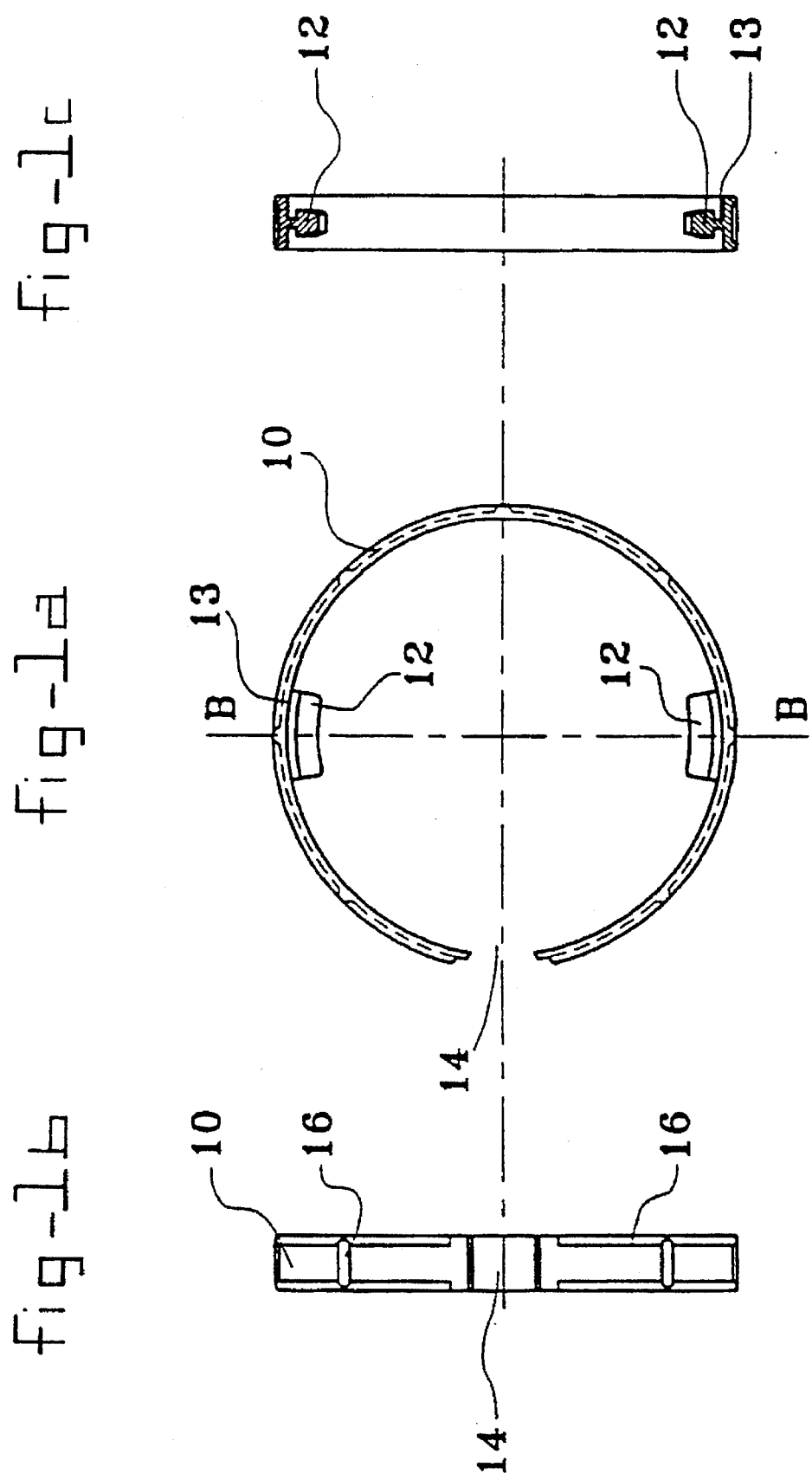

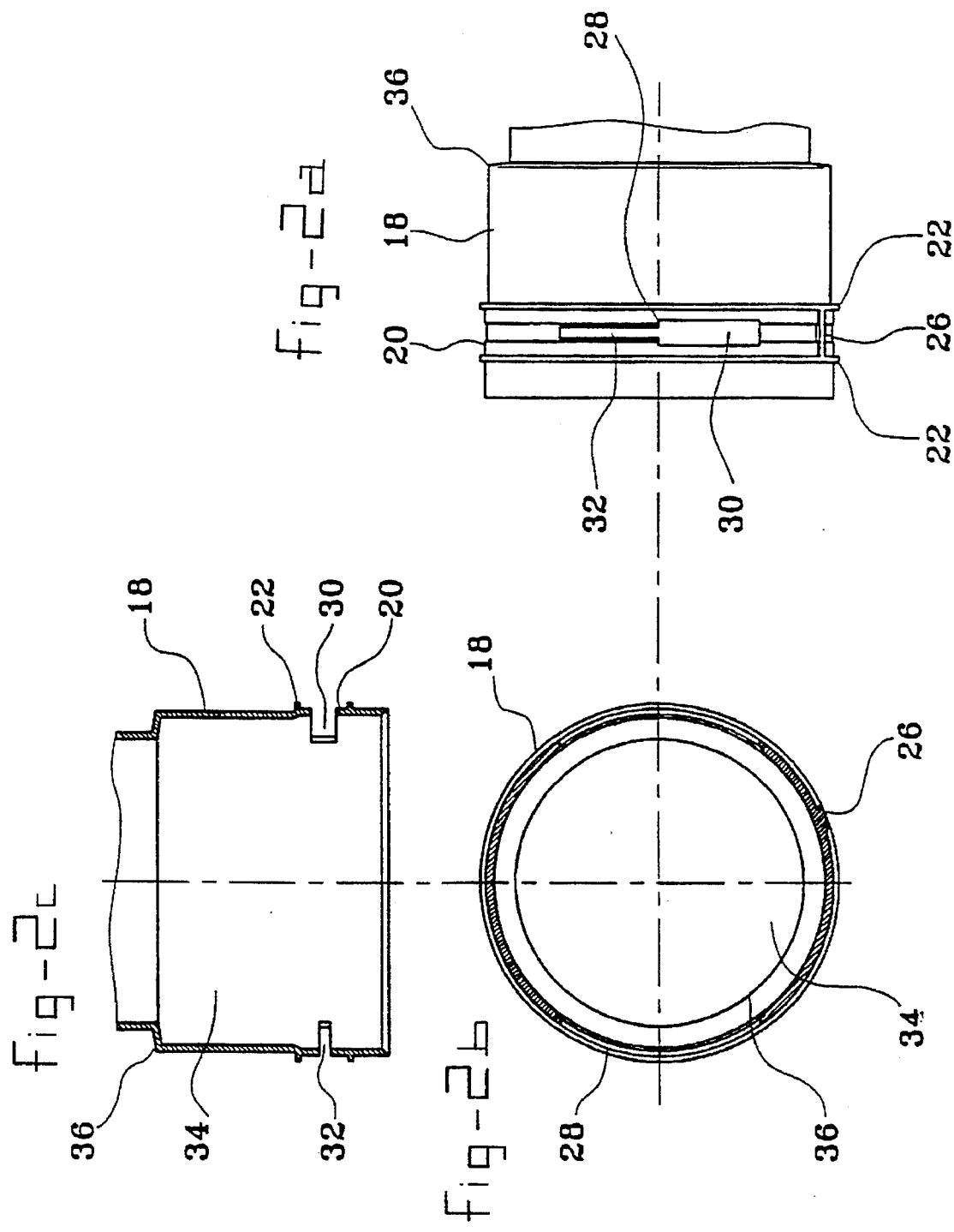

FASTENING COUPLING FOR A RINGED TUBE

FIELD OF THE INVENTION

The subject of the present invention is a fastening coupling for a ringed tube.

BACKGROUND OF THE INVENTION

Many couplings currently exist, making it possible to connect tubes, either to one another or to certain specific devices. Most of these couplings are conventional threaded couplings.

However, couplings which operate without a screw thread are also known.

For example, French Patent FR 2,391,411 proposes a coupling for two tubes, at least one of which is a corrugated tube including helical ribs. This coupling comprises an annular coupling element engaged in a groove of the corrugations of a first tube close to its end, so that it projects radially around the tube, and an annular stop mounted on the second tube. The annular coupling element is fastened to the stop so as to hold the two tubular elements together. In order to be sealed, this type of coupling has to be tightened a great deal, and any relative rotational movement of one tube with respect to the other would break the seal of the coupling.

Described in European Patent EP 0,444,857 B1 is a coupling making it possible to join a corrugated tube to a coupling member in a sealed manner and without a screw thread. This member comprises a cylindrical cavity in which one end of the corrugated tube is housed. A split ring which can expand radially is fastened to the end of the corrugated tube. When the tube is introduced into the cavity, the split ring is compressed and locks into a circumferential groove made in the cylindrical cavity. Sealing is provided by one or more toric seals mounted on the corrugated tube behind the split ring. One of the main disadvantages of this type of coupling is that it is almost impossible to take apart without destroying it.

SUMMARY OF THE INVENTION

The object of the present invention is to propose a non-threaded fastening coupling for a ringed tube which can easily be fitted and taken apart, and which withstands possible tension and rotation exerted on the tube. It is especially desirable for it to be possible for this coupling easily to be sealed against the fluids conveyed. This type of coupling finds a particularly advantageous application in the lining of flues for domestic heating, with a view to shielding the walls of chimneys from the aggressive action of the combustion gases and corrosive condensates. To this end, in old dwellings, tubes and coupling accessories which have to meet numerous requirements such as resistance to high temperatures and to corrosive fluids, a high degree of sealing, great ease of fitting and taking apart, and low cost, have to be inserted in the chimneys after the dwelling has been built.

To this end, the present invention relates to a fastening coupling for a ringed tube, comprising at least one sleeve, the inside diameter of which is at least equal to, and preferably very little greater than, the largest outside diameter of the ringed tube, inside which one end of the ringed tube becomes housed, as well as at least one fastening ring, which is characterized in that the sleeve includes at least two cicumferentially aligned orifices, each comprising a wide part and a narrow part, these parts being adjacent and intercommunicating; the ring is circumferentially discontinuous and radially deformable and is provided with at least two tenons projecting inwards, each one comprising a narrow base; the ring can be applied around the sleeve so that each tenon passes through the wide part of an orifice and engages in the ringed structure of the tube so as to retain it axially inside the sleeve; it being possible, by rotating the ring, to fit the narrow base of each tenon into the narrow part of an orifice so as to prevent any radial movement of the ring.

A ringed tube is intended to denote a tube, the wall of which comprises numerous channels and protrusions on its outside surface. In general, such tubes ape cylindrical overall, and their channels and protrusions have symmetry of revolution. However, the present invention is also applicable to ringed tubes whose cross section may be other than circular, for example elliptical.

Such tubes may especially consist of metal of plastic. When they are intended for lining flues, these tubes are often made of polyvinylidine fluoride. By way of example of such lining tubes, mention may be made of the RENOFLEX® tubes by the company DRAKA POLVA, made from polyvinylidine fluoride SOLEF® (by the company SOLVAY).

Fastening coupling is intended to denote any device making it possible to couple, in a straight of otherwise fashion, one tube to another tube or to any appliance such as a pump, a boiler, or alternatively to a blanking piece, without any risk of the tube detaching from the coupling under the effect of vibration of tensile or rotational forces.

Sleeve denotes a hollow body open at least at one of its ends, and often at both ends. Usually, the sleeves used in the context of the invention have the overall shape of a cylinder, or consist of several successive cylindrical sections of different diameters. The sleeve may be made of any material suitable for this use and for the fluids conveyed, as explained hereinabove for the tubes.

The orifices made in the sleeve are preferably uniformly spaced around it; thus, for example, they are preferably diametrally opposed when they are two in number.

The ring may be made of any appropriate material, for example metal or plastic, provided that the two ends can be separated radially in order to fit it around the sleeve. The width of the slot separating the two ends of the ring is selected as a function of the outside diameter of the sleeve and of the flexibility of the ring. Advantageously, the outside surface of the ring has one or more transverse and/or circumferential ribs, in order to increase its rigidity.

The tenons with which the ring is provided are generally circumferentially elongate and preferably have a substantially rectangular developed section, as do the wide parts of the orifices made in the sleeve, through which they have to be able to pass. Advantageously, these tenons have dimensions very slightly smaller than those of the wide parts of the orifices. The same considerations apply to the bases of the tenons with respect to the narrow parts of the said orifices. In transverse section, the base of a tenon may either form a narrow region continuously connected to the end of the tenon by progressive widening, or constitute a region of small but constant width preceding the end of the tenon which has a greater width.

The tenons are intended to engage in the ringed structure of the tube; for preference, the share of the ends of the tenons corresponds to that of the channels exhibited by the outside wall of the tube, so that the ends of the tenons can be accommodated in these channels and firmly immobilize the tube in the axial direction, while not totally preventing any possible rotation. For this reason, and also to facilitate their insertion into the orifides of the sleeve, the ends of the tenons, in transverse section, preferably have an appropriate section, for example in the share of a trapezium, with the corners possibly rounded off.

The length, width, and number of the tenons are especially chosen as a function of the diameter of the sleeve and of the tensile force that the coupling is to withstand. If this force is high, tenons will be chosen whose lateral surface for bearing against the ringed tube is relatively greater than for a coupling which is subjected merely to small forces.

One advantage of the coupling according to the present invention lies in the fact that it can be fitted easily, without special tooling. Furthermore, it can be disassembled and reassembled several times over without the quality of the coupling suffering as a result. In addition, after coupling, the ringed tube can still undergo rotation about its axis without this detracting from the quality of the coupling.

According to a specific embodiment, the coupling of the present invention may be sealed by means of at least one seal located close to the end of the tube, between the outside surface thereof and the sleeve, so as to improve the sealing of the coupling against fluids.

This seal may be made from any material known for this purpose; this is generally an elastomer suited to the envisaged use. Thus, for example, if the fluid conveyed in the tube is at high temperature, a fluorinated elastomer may especially be used.

The section, the number of seals and their quality depend on the degree of sealing which is desired to be obtained, as well as on the nature and properties of the fluid transported in the tube. It is important to emphasize that the sealing function is independent of the coupling function. The section of the seal may be arbitrary, for example toric or trapezoidal. For preference, the section of the seal corresponds to the shape of the channels in the outside wall of the tube, so that it can be inserted between two channels and be axially immobilized there. It may be beneficial for the seal to include, on its outside face, that is to say, the one that will be in contact with the inside surface of the sleeve, one or more annular lips so as to reduce friction during the insertion of that end of the tube which is equipped with the seal inside the sleeve, while guaranteeing a high degree of sealing.

It is possible to combine several different types of seal on one and the same tube. The position of the seal on the end of the tube is chosen so that the seal finds itself inside the sleeve once the end of the tube has been inserted therein, and thus provides sealing between the tube and the sleeve. More precisely, it is appropriate for the seal to be arranged at a location situated between the end of the tube and the orifices into which the ends of the tenons will be inserted once the fastening ring has been installed, in order to prevent any leakage through these orifices.

For preference, the outside surface of the sleeve includes a stop preventing the fastening ring from turning after it has been installed. The position of the stop is generally chosen to be in immediate proximity to one of the two ends of the ring when the latter is in its final position. In this way, the ring can no longer turn in either direction. In point of fact, in one direction the rotation is limited by the narrow parts of the orifices, and in the other by the stop. The fastening therefore cannot become undone unintentionally even if it subjected to vibration or rotation of the tube.

Advantageously, the outside surface of the sleeve is equipped with a seat delimited by protrusions, so as to facilitate the axial positioning of the ring. These protrusions may for example consist of small pads uniformly spaced around the periphery of the sleeve, and aligned circumferentially, so as to form two circular rows the separation of which corresponds to the width of the ring. They may equally well consist of two continuous or discontinuous ribs with the same separation. These protrusions facilitate the positioning of the fastening ring on the sleeve and may contribute to reinforcing the latter. To this end, the use of two continuous ribs is preferred.

According to another embodiment, the space inside the sleeve comprises an annular shoulder forming an internal stop against which the end of the ringed tube rests.

Considering the sleeve from the end via which the tube enters it, this annular stop is situated after the orifices through which the tenons of the ring can pass. This stop prevents the ringed tube from being inserted too far into the sleeve.

For preference, the inside edge of the annular shoulder has a projection coaxial with the sleeve and forming with the inside surface of the sleeve an annular region in which the end of the ringed tube is housed.

Circumferentially, the projection may be continuous or discontinuous; in the latter case, it is preferable for the projection to be present at least in line with the narrow parts of the orifices of the sleeve.

Advantageously, the annular shoulder is equipped with a section of cylinder coaxial with the sleeve, the diameter of which corresponds to the inside diameter of the annular shoulder.

This projection of the inside edge of the annular shoulder makes it possible to strengthen the tube against radial compressive loads that may in some cases be brought about by the tenons with which the fastening ring is provided and/or the seal(s). Furthermore, the annular shoulder and its projection or projections may contribute to facilitating the flow of fluid inside the coupling close to the end of the tube.

According to an advantageous alternative, the coupling further comprises a reinforcing piece which is inserted inside the end of the ringed tube.

This piece reinforces the tube inside the sleeve and strengthens it against the radial compressive load that may in some cases be brought about by the tenons with which the fastening ring is equipped and/or the seal(s). Furthermore, if its length is sufficient, this piece reinforces the tube at the sleeve entrance. In this way, the risk of the edge of the sleeve damaging the tube, for example in the event of the tube bending, is minimized. The piece preferably includes at one of its ends a continuous or discontinuous outwardly pointing annular rim, the outside diameter of which is such that it still allows the piece to be inserted into the sleeve, in order to guarantee that this piece remains located at the end of the tube and does not move axially inside it. The piece may be made of any material suitable for this use and for the fluids conveyed, for example metal or plastic. Its section is matched to that of the inside of the tube; and it is generally circular.

In another alternative, that end of the sleeve pointing towards the ringed tube has a frustoconical part, especially so as to facilitate the insertion of the tube into it.

The frustoconical part is particularly useful for connecting a tube of relatively large diameter to a coupling. Indeed, as the inside diameter of the sleeve has a diameter substantially equal to the largest outside diameter of the ringed tube, the frustoconical part situated at the sleeve entrance will facilitate the insertion of the tube. Furthermore, this frustoconical part avoids the seal located at the end of the tube being moved or damaged while the end of the tube is being inserted into the sleeve.

On the outside surface of the sleeve, the coupling may advantageously include a channel for guiding the tenons. This channel may be continuous or exist only near to the orifices. It allows the tenons to be guided into the orifices, while the fastening ring is being installed around the sleeve, something which may be useful when performing a coupling operation at a site which is not readily accessible, when an operator is coupling a tube without being able to see it.

BRIEF DESCRIPTION OF THE DRAWINGS

Other advantages and features of the invention will emerge from the detailed description of one particular coupling in accordance with the invention described by way of non-limiting example on the basis of the appended drawings, in which:

FIG. 1a represents a front-on view of the fastening ring;

FIG. 1b shows a profile view of the fastening ring;

FIG. 1c shows a longitudinal section through the fastening ring (section on BB of FIG. 1a);

FIGS. 3a, 3b and 3c show the various steps in the coupling of a ringed tube and of a sleeve, in transverse section;

DETAILED DESCRIPTION OF THE DRAWINGS

Figure 2C:
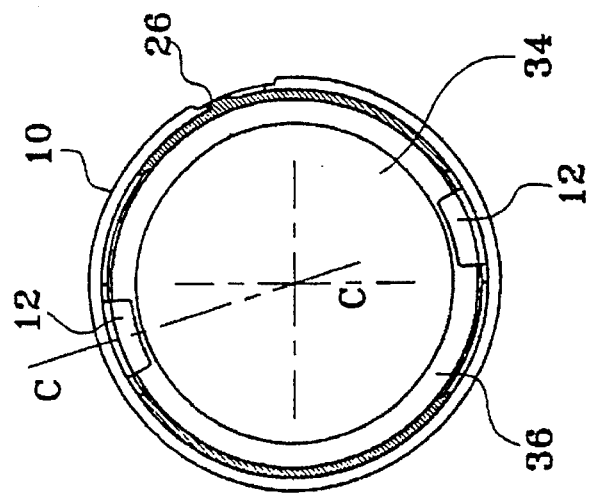
FIG. 2c represents a longitudinal section through the sleeve (section on a plane containing its axis and passing through the centre of its orifices)

In the various figures, identical references denote identical elements.

In FIGS. 1a, 1b and 1c the fastening ring is identified overall by the preference 10. It comprises two tenons 12 projecting inwards, and diametrically opposed. A slot 14 is made in the ring 10 so that its two ends can be separated partially in order to fit it around the sleeve. The width of the slot 14 of the ring 10 is chosen as a function of the outside diameter of the sleeve and of the flexibility of the ring. It goes without saying that this ring has to be made of a sufficiently flexible material so that it can be expanded radially in order to fit around the sleeve (see FIG. 3).

In FIG. 1b the reinforcing ribs 16 on the outside surface of the ring 10 may be seen.

In FIGS. 1b and 1c, the narrower base 13 of each of the tenons 12 is visible.

Figure 2B:
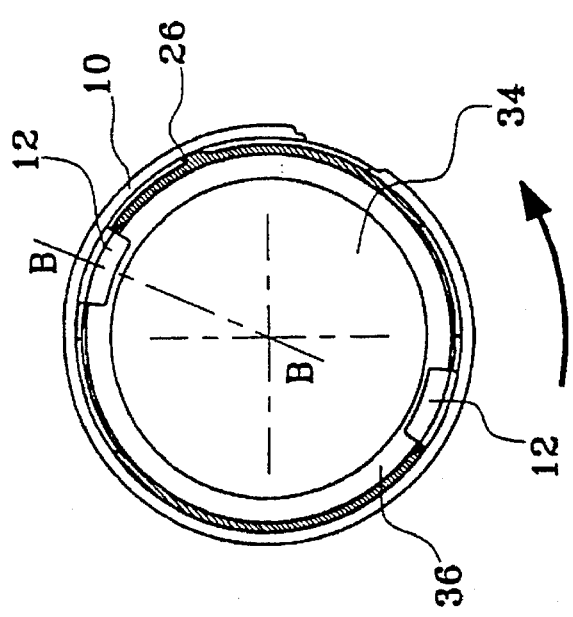
FIG. 2b represents a transverse section through the sleeve (section on a plane perpendicular to its axis and passing through the centre of its orifices)
Figure 2A:
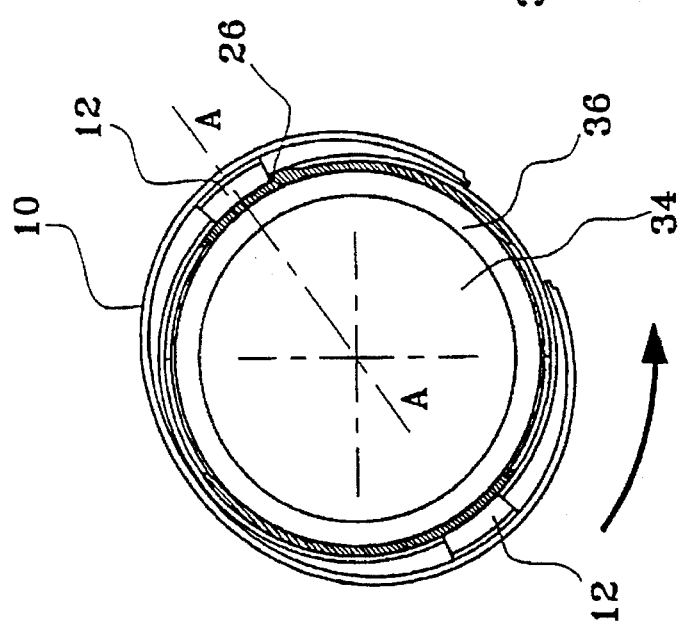
FIG. 2a represents a profile view of the end of the sleeve.

FIGS. 2a, 2b and 2c represent various views of the sleeve 18 of a coupling in accordance with the invention. Here, it is possible to see the seat 20 on which the fastening ring (not represented) may be located. This seat is delimited on each side by a rib 22 which serves as a guide when the fastening ring is being applied. Provided at the centre of this seat is a guide channel, into which the tenons 12 of the fastening ring 10 can slide while it is being applied.

The outside surface of the sleeve also comprises a stop 26. The orifices 28 comprise a wide part 30 and an adjacent narrower part 32. The wide part 30 of the orifices 28 is dimensioned so that the tenons 12 of the ring 10 can easily penetrate them while the narrow part 32 of the orifices 28 is dimensioned as a function of the bases of the tenons, which are narrower, so that these can engage therein, thus preventing the fastening ring 10 from being expanded radially after it has been installed.

The space 34 inside the sleeve, where the ringed tube (not represented) will become housed, comprises an annular shoulder 36 forming a stop for the ringed tube.

FIGS. 3a, 4a, 3b, 4b and 3c, 4c show a sequence in the fitting together of the coupling according to the present invention.

Figure 4A:
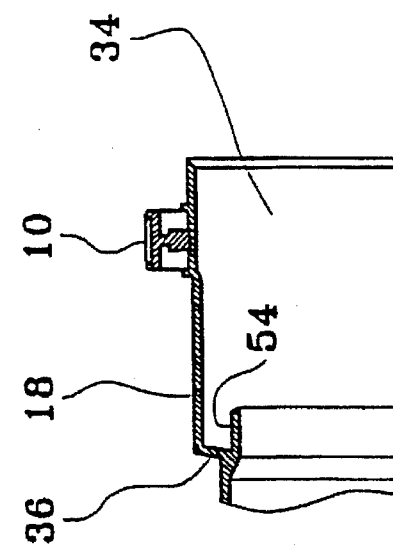
FIGS. 4a, 4b and 4c represent longitudinal sections on A—A, B—B and C—C of the sleeves of FIGS. 3a, 3b and 3c respectively.

In FIGS. 3a and 4a (the latter representing a section on AA of FIG. 3a) it is possible to see the fastening ring 10 which has been radially expanded so as to be fitted around the sleeve 18. The tenons 12 may be in any position, and rest against the bottom of the guide channel 24.

Figure 4B:
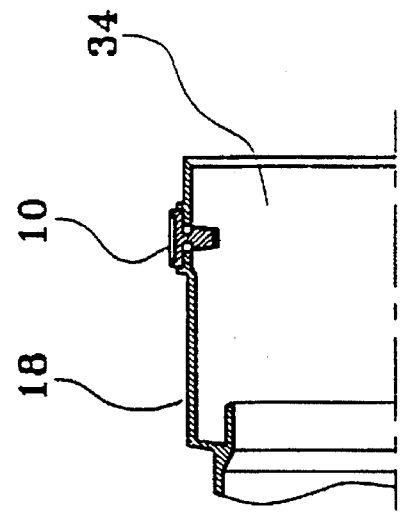

By turning the fastening ring 10 in the direction indicated by the arrow in FIG. 3a, the tenons 12 penetrate the wide parts 30 of the orifices 28, the dimensions of which have been selected for this purpose. As the tenons 12 are wider than the narrow parts 32 of the orifices 28 but less wide than their wide parts 30, they can engage directly only in the latter parts. As the fastening ring 10 is under tension as it has been expanded radially, the tenons 12 will be pushed into the wide parts 30 of the orifices 28 as soon as they come to face them, as represented in FIGS. 3b and 4b.

By continuing to turn the fastening ring 10 in the same direction, the narrow bases 13 of the tenons 12 engage in the narrow parts 32 of the orifices 28. The fastening ring 10, in this position, can no longer be expanded radially. The ends of the tenons 12 are engaged between 2 ribs of the ringed tube, the end of which had previously been inserted inside 34 the sleeve, so as to retain the tube axially.

Figure 4C:
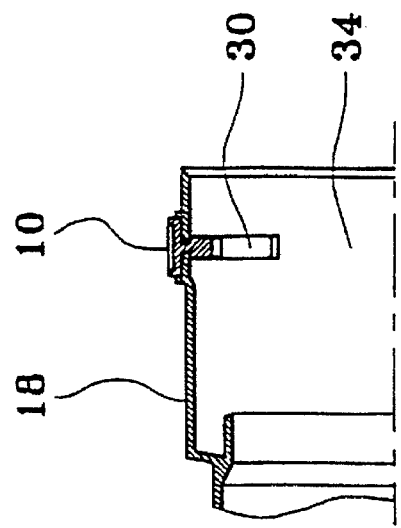

When the ring is in its final position, as represented in FIGS. 3c and 4c, the stop 26 prevents the fastening ring 10 from turning in the opposite direction, i.e. it is not possible for the fastening ring 10 to return to its initial position without its end in contact with the stop 26 being lifted somewhat. It is obvious that for reasons of effectiveness, the position of the stop 26 is preferably chosen so that it is in immediate proximity to or in contact with an end of the fastening ring 10 when the latter is in its final position. Thus, even when the coupling is subjected to vibration or to a rotational movement, the fastening will not become undone of its own accord.

Figure 5:
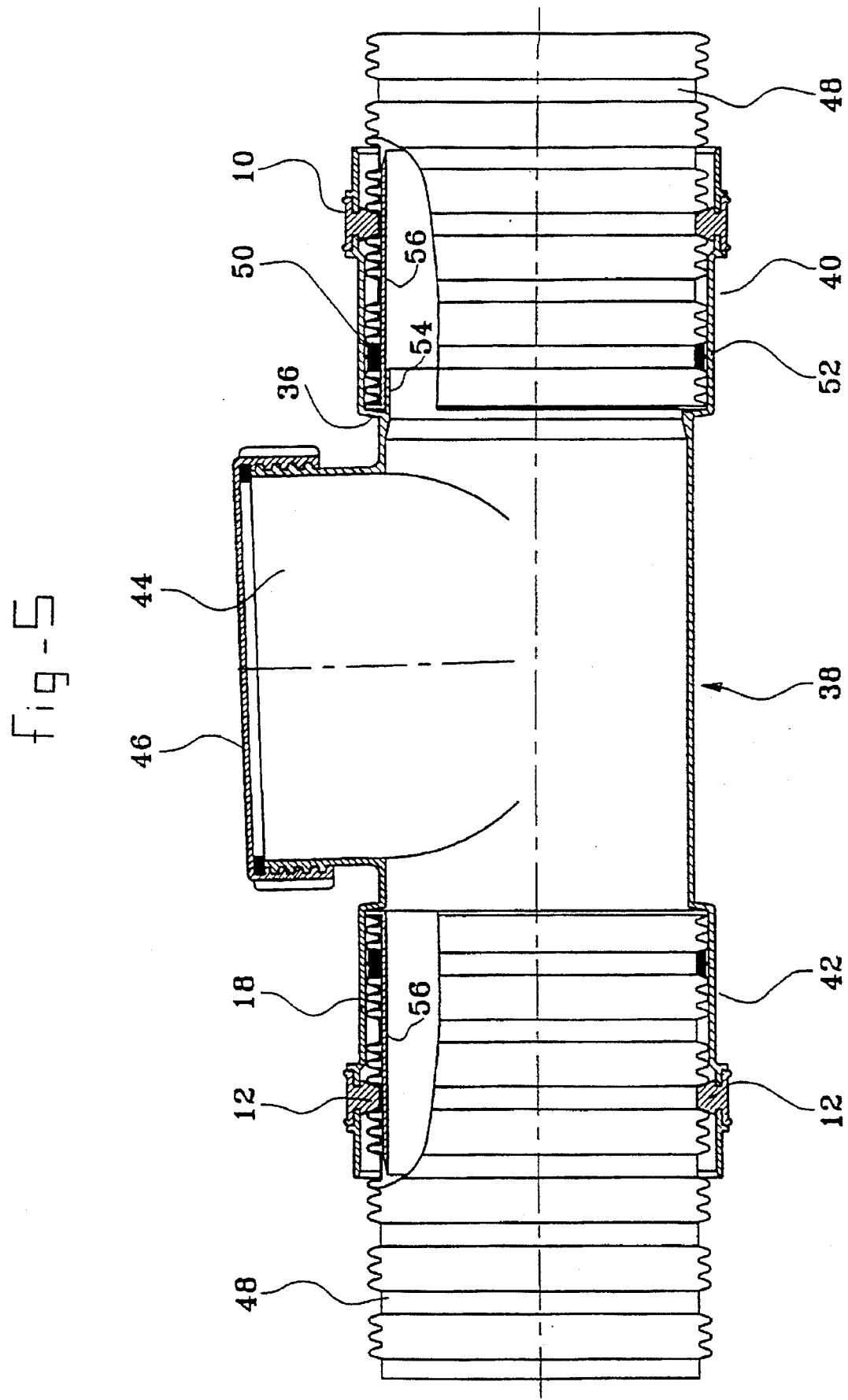
FIG. 5 represents a T-piece comprising 2 couplings in accordance with the invention.

FIG. 5 shows a T-piece 38 which comprises two couplings 40 and 42 in accordance with the invention and an inspection opening or opening for the coupling of a side line 44, blanked off by a screwed-on cover 46.

This device is designed to be used for lining flues for domestic heating. It connects together two ringed RENOFLEX® tubes from the company DRAKA POLVA, made from polyvinylidine fluoride SOLEF® (from the company SOLVAY). These tubes display excellent resistance to corrosion and to aging, even in very severe conditions. The external appearance of these tubes is quite specific in that the corrugations are not uniform but are in the form of separate groups of several ribs and channels, separated by purely cylindrical sections. The coupling element of FIG. 5 is particularly useful for coupling this sort of tube.

The couplings 40 and 42 are of the same type as the one represented in the preceding figures. After assembly, the ends of the tenons 12 are located between two groups of ribs and channels of the tube. In this way, the tube is axially immobilised inside the sleeve.

The tubes 48 are equipped with a toric seal 50 of trapezoidal section, equipped with a lip 52 pointing outwards, preventing any leak of toxic or corrosive emanations.

The space inside the coupling 40 includes an annular shoulder 36 forming a stop for the ringed tube. On the inside edge of this annular shoulder is fastened a cylindrical projection 54 which, together with the inside wall of the sleeve, forms an annular region in which the end of the tube 48 is housed. This region serves as a guide for the tube and improves the flow of fluid inside the coupling. In the case of networks of tubes intended for lining flues for domestic heating, this annular shoulder 36 and this projection 54 also facilitate the sweeping of the chimney and prevent soot or condensates from being deposited between the coupling and the tube.

After its insertion in the sleeve, the end of the tube was reinforced by an internal cylindrical piece 56, the end of which includes an outwardly pointing annular rim which limits its penetration into the tube.

I claim:

1. Fastening coupling for a ringed tube, comprising at least one sleeve having an inside diameter which is at least equal to the largest outside diameter of the ringed tube, one end of the ringed tube adapted to be housed inside said sleeve, and a fastening ring;

said sleeve including at least two circumferentially aligned orifices, each comprising a wide part and a narrow part, the wide part and the narrow part of each orifice being adjacent and intercommunicating;

said ring being circumferentially discontinuous and radially deformable and being provided with at least two tenons projecting radially inwards, each tenon comprising a narrow base;

said ring adapted to be applied around the sleeve so that each tenon passes through the wide part of an orifice and engages in the ringed structure of the tube so as to retain it axially inside the sleeve; whereby upon rotation of the ring the narrow base of each tenon fits into the narrow part of an orifice.

2. Fastening coupling according to claim 1, further comprising at least one seal located adjacent to the end of the tube, between the outside surface thereof and the sleeve.

3. Fastening coupling according to claim 1, wherein the outside surface of the sleeve includes a stop preventing the fastening ring from turning.

4. Fastening coupling according to claim 1, wherein the outside surface of the sleeve is equipped with a seat delimited by protrusions, so as to facilitate the axial positioning of the ring.

5. Fastening coupling according to claim 1, wherein the sleeve comprises an annular shoulder forming an internal stop against which the end of the ringed tube rests.

6. Fastening coupling according to claim 5, wherein an inside edge of the annular shoulder has a projection coaxial with the sleeve, and forming with the inside surface of the sleeve an annular region in which the end of the ringed tube is housed.

7. Fastening coupling according to claim 1, further comprising a reinforcing piece which is inserted inside the end of the ringed tube.

8. Fastening coupling according to claim 1, wherein the end of the sleeve pointing towards the ringed tube has a frustoconical part.

9. Fastening coupling according to claim 1, including, on the outside surface of the sleeve, a channel for guiding the tenons.

* * * * *